United States Patent [19]

Naylor

[11] 3,896,102
[45] July 22, 1975

[54] PREPARATION OF POLYBUTADIENE
[75] Inventor: Floyd E. Naylor, Bartlesville, Okla.
[73] Assignee: Phillips Petroleum Company, Bartlesville, Okla.
[22] Filed: Apr. 25, 1974
[21] Appl. No.: 463,978

[52] U.S. Cl............................ 260/94.3; 252/429 C
[51] Int. Cl.......................... C08d 1/14; C08d 3/08
[58] Field of Search ......... 260/94.3, 94.2 M, 429 C

[56] References Cited
UNITED STATES PATENTS
3,050,513  8/1962  Zelinski et al. .................... 260/94.3
3,066,129  11/1962  Farrar............................... 260/94.3
3,223,694  12/1965  Farrar............................... 260/94.3
3,361,730  1/1968  Naylor............................... 260/94.3

FOREIGN PATENTS OR APPLICATIONS
657,765  2/1963  Canada............................. 260/94.3

Primary Examiner—William F. Hamrock

[57] ABSTRACT 1,3-Butadiene is polymerized employing a four-component catalyst comprising: (a) an organoaluminum hydride; (b) an organolithium or organosodium compound; (c) a titanium halide component; and (d) an ether.

10 Claims, No Drawings

PREPARATION OF POLYBUTADIENE

BACKGROUND

The invention relates to a method and a catalyst for polymerizing 1,3-butadiene. In another aspect it relates to a method and a catalyst for the production of trans-polybutadiene.

It is known that polymers of dienes, such as 1,3-butadiene, are very useful polymeric materials. Polybutadiene is produced with multifarious properties, many of which can be determined by the polymerization process and/or catalyst. For example, catalysts can be chosen to produce either a cis or trans polybutadiene, and in general, the higher the trans content of polybutadiene the more resinous it is. High trans polybutadiene is an elastic, tough, crystalline, thermoplastic solid whereas a high cis polybutadiene is a rubbery material. Although there are a number of processes and catalysts known for polymerizing 1,3-butadiene, there is still a demand for new catalysts and processes which are useful to polymerize 1,3-butadiene.

It is an object of the invention to produce polymers.

Another object of the invention is to produce polymers of 1,3-butadiene.

Another object of the invention is to produce trans polybutadiene.

Still another object of the invention is to provide a novel catalyst for the production of polybutadiene.

Other objects, aspects, and advantages of the invention will become apparent to those skilled in the art upon studying the specification and the appended claims.

SUMMARY

In accordance with the invention a polybutadiene is produced by contacting 1,3-butadiene under polymerization conditions with a novel catalyst comprising: (a) an organoaluminum hydride; (b) an organolithium or organosodium compound; (c) a titanium halide component; and (d) an ether.

DETAILED DESCRIPTION OF THE INVENTION

The organoaluminum hydride employed in the catalyst system of the present invention is represented by the general formula $R_aAlH_b$ wherein R is an alkyl, cycloalkyl, and combinations thereof, such as alkylcycloalkyl, containing from about 1 to 16 carbon atoms, $a$ is an integer from 1 to 2, $b$ is an integer from 1 to 2 such that the sum of $a$ plus $b$ equals 3. Examples of such organoaluminum hydrides include dimethylaluminum hydride, diethylaluminum hydride, ethylaluminum dihydride, methyl isopropylaluminum hydride, cyclohexylaluminum dihydride, ethyl cyclohexylaluminum hydride, methyl 4-ethylcyclohexylaluminum hydride, didodecylaluminum hydride, ethyl hexadecylaluminum hydride, and eicosylaluminum dihydride.

The organolithium or organosodium compound suitable for use in accordance with the invention is represented by the general formula $R'M_x$ wherein $x$ is an integer from 1 to 4, $R'$ is a hydrocarbon radical selected from the group consisting of aliphatic and cycloaliphatic radicals containing from 1 to about 20 carbon atoms per radical and M is lithium or sodium. Examples of suitable organolithium and/or organosodium compounds include methyllithium, isopropyllithium, n-butyllithium, t-octylsodium, n-decylsodium, 4-phenylbutyllithium, cyclohexyllithium, 4-butylcyclohexylsodium, 4-cyclohexylbutyllithium, dilithiomethane, 1,4-disodiobutane, 1,10-dilithiodecane, 1,20-dilithioeicosane, 1,4-disodiocyclohexane, 1,4-disodio-2-butene, 1,8-dilithio-3-decene, 1,2-dilithio-1,2-diphenylethane, and 1,2-disodio-1,8-diphenyloctane.

The titanium halide component of the catalyst system is selected from the group consisting of titanium tetrachloride and molecular iodine, titanium tetrabromide and molecular iodine, or titanium tetraiodide with or without molecular iodine.

The ethers suitable for use in the invention are represented by the general formula $R''—O—R'''$ wherein $R''$ and $R'''$ are alkyls or cycloalkyls containing from about 1 to 12 carbon atoms per $R''$ or $R'''$ group and wherein the ether contains up to 20 carbon atoms per molecule. Nonlimiting examples include dimethyl ether, diethyl ether, di-n-butyl ether, methyl ethyl ether, methyl dodecyl ether, ethyl cyclohexyl ether, dicyclohexyl ether, n-octyl n-dodecyl ether, and mixtures thereof.

The catalyst composition, on a mole raito basis, varies widely. Generally, the mole ratio of the organolithium or organosodium compound to the organoaluminum hydride is in the range of from about 1:1 to 1:3, although good results were obtained employing a mole ratio ranging from about 1:1 to 1:1.5. The mole ratio of the titanium tetrahalide in the titanium halide component of the catalyst to the organoaluminum hydride is in the range of from about 1:1 to 0.1:1, although good results were obtained with a mole ratio ranging from about 0.5:1 to 0.2:1. The mole ratio of titanium tetrachloride or titanium tetrabromide to the molecular iodine is in the range of from about 1:1 to 0.1:1, but good results were obtained employing a mole ratio ranging from about 0.5:1 to 0.33:1.

With respect to the quantity of ether employed in the catalyst system, the amount varies widely and depends upon the choice of ether and to a lesser degree upon the relative importance of conversion versus trans content of the polymer. Although many ethers are suitable for use in the invention, methyl ethers have the greatest effectiveness per unit weight. Also initially increasing the amount of ether increases both the conversion and trans content; however, generally a point is reached beyond which additional ether will increase trans content but reduce conversion. Normally, though, the amount of ether present during the polymerization is in the range of from about 0.01 to 30 parts by weight per hundred parts by weight butadiene.

Generally, the polymerization mixture contains a diluent. Diluents suitable for use in the process are compounds which are not detrimental to the polymerization process. Suitable diluents include paraffinic and cycloparaffinic hydrocarbons and mixtures thereof. Examples of such diluents include n-hexane, n-heptane, 2,2,4-trimethylpentane, and cyclohexane. The inventive process is operable over a broad range of concentrations of butadiene in the diluent. For example, normally the concentration of butadiene in the diluent is in the range of from about 1 to 200 weight percent, but a range of from about 5 to 50 weight percent has been used successfully.

The total quantity of catalyst required to effect polymerization of the 1,3-butadiene to polymer can be determined readily by one skilled in the art and depends upon the trans content desired and the particular conditions such as temperature, impurities, molecular weight desired and the like. Normally, the total quantity of catalyst expressed in gram millimoles of the organoaluminum hydride per hundred grams of butadiene varies in the range of from about 0.3 to 30; however, a more economical range of from about 0.5 to 10 has produced good results.

The trans content of the polymer produced employing the inventive catalyst system varies considerably. Normally the polymer produced has a substantial trans content, such as for example, between 60 to 95 percent; however, a polymer with a trans content outside this range can be made with the present catalyst system.

Polymerization can take place in a wide range of temperature. A convenient range in which effective polymerization can be obtained is 0° to 120°C, with good results obtained employing a range from about 30° to 80°C. Also the polymerization pressure varies widely. The polymerization reaction can be carried out under autogeneous pressure or at any suitable pressure sufficient to maintain the reaction mixture substantially in the liquid phase. Generally the pressure will thus depend upon the particular diluent being employed and the temperature at which the polymerization is carried out. However, higher pressures can be employed if desired by using a suitable method such as the pressurization of the reactor with the gas which is inert with respect to the polymerization reaction.

Various materials are known to be detrimental to the catalyst of the invention. These materials include carbon dioxide, oxygen, and water. It is usually desirable, therefore, that the reactants and catalysts be freed of these materials as well as other materials which may tend to inactivate the catalyst. Furthermore, it is desirable to remove air and moisture from the reaction vessel in which the polymerization is to be conducted. Upon completion of the polymerization, the polymerization mixture is then treated to inactivate the catalyst and to recover the polymer. A suitable method for accomplishing this result involves steam stripping the diluent from the polymer. In another suitable method a catalyst-inactivating material, such as an alcohol, is added to the mixture so as to inactivate the catalyst and cause precipitation of the polymer. The polymer is then separated from the alcohol and diluent by any suitable means, such as decantation or filtration. It has been found to be advantageous to add an antioxidant, such as 2,6-di-t-butyl-4-methylphenol to the polymer solution prior to recovery of the polymer.

Polymers can be compounded by methods as known in the art. Compounding ingredients, such as fillers, dyes, pigments, curing or crosslinking agents, softeners, reinforcing agents, and the like, can be used in the compounding operation. In manufacturing finished articles, the polymer can be molded or extruded. They can be advantageously employed in the manufacture of items such as insulating wires and cables, including such for underwater service, battery cases, and golf ball covers.

Illustrative Examples

The polymerizations were carried out under nitrogen in capped beverage bottles employing anhydrous reactants and conditions. The bottles were tumbled in a constant temperature bath for the stipulated polymerization times and at the stipulated temperatures. Following polymerization, 2,6-di-t-butyl-4-methylphenol (1 part by weight per hundred parts of monomer) was added in a 50/50 volume toluene/isopropyl alcohol solution, the polymer solutions were filtered, and the polymers were coagulated by adding the filtrates to isopropyl alcohol. The polymers were then collected by filtration and dried at reduced pressure. Polymers thus produced were thermoplastic in character.

Shown immediately below are definitions of abbreviations and terms employed in the following working examples. Also included are descriptions and references for analytical and evaluation methods employed.

| | |
|---|---|
| m.p. | Melting point, °C |
| f.p. | Freezing point, °C |
| mhm. | Gram millimoles per hundred grams monomer |
| phm. | Parts by weight per 100 parts by weight monomer | a. Inherent Viscosity (I.V.) was determined using tetrahydrofuran instead of toluene by the process shown in U.S. Pat. No. 3,278,508, column 20, note a, with the further modification that the solution was not filtered through a sulfur absorption tube, but rather a sample of the solution was filtered through a fritted glass filter stick of grade C porosity and pressured directly into the viscometer.

b. Differential Thermal Analysis (DTA) melting points and freezing points were determined on DuPont instrument DTA-900 differential thermal analyzer employing a differential scanning calorimeter cell. The point of maximum deflection of the endotherm or exotherm under a nitrogen atmosphere was observed. Heating and cooling rates employed were each 10° per minute. The size of samples analyzed was approximately 15 mg.

c. Polymer microstructure, i.e., trans and vinyl contents were determined by infrared absorption spectroscopy (I.A.S.).

EXAMPLE I (Runs 1–18)

The following inventive runs illustrate the invention and, in particular, the effect on conversion and trans content of varying the amount of ether, i.e., dimethyl ether, employed. Also the amount of the other catalyst components was also varied but at constant relative amounts. The runs were made in accordance with the following recipe and the results are tabulated below.

Recipe

| | phm |
|---|---|
| n-Hexane | 660 |
| n-Butyllithium (n-BuLi) | variable |
| Diethylaluminum hydride (Et$_2$AlH) | variable |
| Dimethyl Ether (Me$_2$O) | variable |
| Iodine | variable |
| Titanium tetrachloride | variable |
| Butadiene | 100 |
| Temperature (°C) | 50 |
| Time (Hours) | 3.66 |

TABLE I

| Run No. | n-BuLi mhm | Et₂AlH mhm | TiCl₄ mhm | Iodine mhm | Me₂O mhm | Conversion Wt. % | DTA m.p. | DTA f.p. | Trans Wt. % | Vinyl Wt. % | IV |
|---|---|---|---|---|---|---|---|---|---|---|---|
| 1 | 1.8 | 1.8 | 0.5 | 1.0 | 0 | 58 | — | — | 3.3 | 5.1 | 3.15 |
| 2 | 1.8 | 1.8 | 0.5 | 1.0 | 2 | 61 | — | — | 16.9 | 4.9 | 1.34 |
| 3 | 1.8 | 1.8 | 0.5 | 1.0 | 4 | 70 | — | — | 51.0 | 3.5 | 2.85 |
| 4 | 1.8 | 1.8 | 0.5 | 1.0 | 8 | 74 | — | — | 75.7 | 2.7 | 3.24 |
| 5 | 1.8 | 1.8 | 0.5 | 1.0 | 16 | 52 | 90 | 54 | 86.2 | 2.3 | 3.87 |
| 6 | 1.8 | 1.8 | 0.5 | 1.0 | 32 | 16 | 110 | 80 | 85.9 | 2.1 | 1.94 |
| 7 | 2.7 | 2.7 | 0.75 | 1.5 | 0 | 5 | — | — | — | — | — |
| 8 | 2.7 | 2.7 | 0.75 | 1.5 | 2 | 26 | — | — | — | — | — |
| 9 | 2.7 | 2.7 | 0.75 | 1.5 | 4 | 62 | — | — | 41.9 | 4.0 | 2.33 |
| 10 | 2.7 | 2.7 | 0.75 | 1.5 | 8 | 72 | — | — | 75.3 | 2.8 | 2.53 |
| 11 | 2.7 | 2.7 | 0.75 | 1.5 | 16 | 70 | — | — | 87.4 | 2.3 | 2.52 |
| 12 | 2.7 | 2.7 | 0.75 | 1.5 | 32 | 30 | 108 | 81 | 88.2 | 2.1 | 2.19 |
| 13 | 3.6 | 3.6 | 1.0 | 2.0 | 0 | 0 | — | — | — | — | — |
| 14 | 3.6 | 3.6 | 1.0 | 2.0 | 2 | 0 | — | — | — | — | — |
| 15 | 3.6 | 3.6 | 1.0 | 2.0 | 4 | 64 | — | — | 31.3 | 4.4 | 2.04 |
| 16 | 3.6 | 3.6 | 1.0 | 2.0 | 8 | 67 | — | — | — | — | — |
| 17 | 3.6 | 3.6 | 1.0 | 2.0 | 16 | 68 | — | — | 83.4 | 2.4 | 3.27 |
| 18 | 3.6 | 3.6 | 1.0 | 2.0 | 32 | 18 | 109 | 81 | — | — | — |

Generally trans values were increased by increasing the dimethyl ether level. Since DTA data is relatively more dependable than trans values determined by IAS, an examination of the DTA data and a comparison of the relationship between DTA data and trans values indicates the trans value for run 6 is erroneously low. Also the polymerization rate was promoted by adding additional dimethyl ether up to a point beyond which additional ether suppressed the rate.

The inherent viscosity values of the polymers produced in accordance with the invention indicated the polymers were of useful molecular weights.

EXAMPLE II (Runs 19–30)

The following runs illustrate the effects of variations in the solvent wherein such variations were studied at various dimethyl ether levels. The runs were made in accordance with the following recipe and the results are tabulated below.

Recipe

| | phm |
|---|---|
| n-Hexane, or cyclohexane, or toluene | 660, 780, or 860 (respectively) |
| n-Butyllithium | 1.8 mhm |
| Diethylaluminum hydride | 1.8 mhm |
| Dimethyl ether | variable |
| Iodine | 1.0 mhm |
| Titanium tetrachloride | 0.5 mhm |
| Butadiene | 100 |
| Temperature, °C | 50 |
| Time, hours | 4 |

TABLE II

| Run No. | Solvent | (CH₃)₂O mhm | Conversion Wt. % | Trans Wt. % | Vinyl Wt. % | IV | DTA m.p. | DTA f.p. |
|---|---|---|---|---|---|---|---|---|
| 19 | n-Hexane | 2 | 55 | 24.0 | 4.6 | 1.87 | | |
| 20 | n-Hexane | 4 | 55 | — | — | — | | |
| 21 | n-Hexane | 8 | 54 | 75.0 | 2.7 | 3.71 | | |
| 22 | n-Hexane | 16 | 32 | — | — | — | 53 | 44 |
| 23 | Cyclohexane | 2 | 74 | 17.3 | 4.7 | 1.87 | | |
| 24 | Cyclohexane | 4 | 73 | 52.5 | 3.5 | 2.17 | | |
| 25 | Cyclohexane | 8 | 77 | — | — | — | | |
| 26 | Cyclohexane | 16 | 72 | 86.9 | 2.3 | 3.61 | 54 | 50 |
| 27 | Toluene | 2 | 69 | 15.7 | 3.9 | 4.82 | | |
| 28 | Toluene | 4 | 4 | — | — | — | | |
| 29 | Toluene | 8 | 0 | — | — | — | | |
| 30 | Toluene | 16 | 7 | | | | | |

Aliphatic and cycloaliphatic diluents are clearly preferred over aromatic solvents as illustrated by the examples above.

EXAMPLE III (Runs 31–35)

The following runs illustrate the invention employing diethyl ether. The runs were made in accordance with the following recipe and the results are tabulated below.

Recipe

| | phm |
|---|---|
| n-Hexane | 660 |
| Diethylaluminum hydride | 1.8 mhm |
| sec-Butyllithium | 1.8 mhm |
| Diethyl ether | variable |
| Iodine | 0.8 mhm |
| Titanium tetrachloride | 0.4 mhm |
| Butadiene | 100 |
| Temperature, °C | 50 |
| Time, hours | 18 |

TABLE III

| Run No. | (C₂H₅)₂O phm | Conversion Wt. % | Trans Wt. % | Vinyl Wt. % | IV |
|---|---|---|---|---|---|
| 31 | 0.0 | 55 | 2.2 | 5.3 | 3.29 |
| 32 | 0.5 | 55 | 46.4 | 3.8 | 2.69 |
| 33 | 1.0 | 55 | 54.0 | 3.7 | 2.97 |
| 34 | 2.0 | 45 | — | — | — |
| 35 | 10.0 | 10 | 88.3 | 2.5 | 2.14 |

A very substantial increase in trans content was observed when the polymerization mixture contained as little as 0.5 phm diethyl ether. Also the trans content was further increased by increasing the amount of ether; however, a point was reached whereby additional ether decreased conversion.

EXAMPLE IV (Runs 36–39)

The runs shown below were made to determine the effect of varying the ether level and the aluminum/titanium atom ratios. These runs were made in accordance with the following recipe and the results are tabulated below.

Recipe

|  | phm |
|---|---|
| n-Hexane | 660 |
| Dimethyl ether | variable |
| Diethylaluminum hydride | 1.8 mhm |
| n-Butyllithium | 1.8 mhm |
| Iodine | variable |
| Titanium tetrachloride | variable |
| Butadiene | 100 |
| Temperature, °C | 50 |
| Time, hours | 4 |

TABLE V

| Run No. | TiCl$_4$ mhm | Iodine mhm | (CH$_3$)$_2$O mhm | Conversion Wt. % | Trans Wt. % | Vinyl Wt. % | IV | DTA m.p. | f.p. |
|---|---|---|---|---|---|---|---|---|---|
| 36 | 0.4 | 0.8 | 5 | 38 | 90.6 | 2.2 | 3.61 | 99 | 70 |
| 37 | 0.6 | 1.2 | 0 | 46 | 23.4 | 5.1 | 1.21 | | |
| 38 | 0.6 | 1.2 | 1 | 56 | 25.3 | 1.8 | 2.24 | | |
| 39 | 0.6 | 1.2 | 5 | 11 | 89.4 | 2.2 | 2.87 | | |

In a comparison of the conversion and trans content of run 36 l with that of runs 37 through 39, it is evident that the lower molar ratio of aluminum alkyl hydride to titanium halide in the latter runs adversely affected the reaction.

EXAMPLE V (Runs 40–44)

The following runs illustrate the operation of the inventive system at 70°C. The runs were made in accordance with the following recipe and the results are tabulated below.

Recipe

|  | phm |
|---|---|
| n-Hexane | 660 |
| Dimethyl ether | variable |
| Diethylaluminum hydride | 1.8 mhm |
| n-Butyllithium | 1.8 mhm |
| Iodine | variable |
| Titanium tetrachloride | variable |
| Butadiene | 100 |
| Temperature, °C | 70 |
| Time, hours | 4 |

TABLE VI

| Run No. | TiCl$_4$ mhm | Iodine mhm | (CH$_3$)$_2$O mhm | Conversion Wt. % | Trans Wt. % | Vinyl Wt. % | IV |
|---|---|---|---|---|---|---|---|
| 40 | 0.45 | 0.9 | 2 | 37 | 66.6 | 3.6 | 2.52 |
| 41 | 0.45 | 0.9 | 4 | 27 | 81.2 | 2.9 | 3.39 |
| 42 | 0.45 | 0.9 | 6 | 53 | 86.9 | 2.7 | 2.82 |
| 43 | 0.45 | 0.9 | 8 | 27 | 86.3 | 2.7 | 3.22 |
| 44 | 0.5 | 1.0 | 8 | 53 | 87.7 | 2.6 | 3.07 |

What is claimed is:

1. A method for polymerizing 1,3-butadiene comprising contacting 1,3-butadiene under polymerization conditions with a four-component catalyst comprising;
a. an organoaluminum hydride represented by the general formula $R_aAlH_b$ wherein R is alkyl, cycloalkyl or mixtures thereof containing from about 1 to 16 carbon atoms, $a$ is an integer from 1 to 2, $b$ is an integer from 1 to 2 such that the sum of $a$ plus $b$ equals 3;
b. an organolithium or organosodium compound represented by the general formula $R'M_x$ wherein $x$ is an integer from 1 to 4, R' is a hydrocarbon radical selected from the group consisting of aliphatic and cycloaliphatic radicals containing from about 1 to 20 carbon atoms per radical and M is lithium or sodium;
c. a titanium halide component selected from the group consisting of titanium tetrachloride plus molecular iodine, titanium tetrabromide plus molecular iodine, and titanium tetraiodide; and
d. an ether represented by the general formula R''OR''' wherein R'' and R''' are alkyl or cycloalkyl groups containing from about 1 to 12 carbon atoms per R'' or R''' group and wherein the ether contains up to 20 carbon atoms per molecule.

2. The method of claim 1 wherein the mole ratio of the organolithium or organosodium compound to the organoaluminum hydride is in the range of from about 1:1 to 1:3; wherein the mole ratio of the titanium tetrahalide in the titanium halide component to the organoaluminum hydride is in the range of from about 1:1 to 0.1:1; wherein the mole ratio of titanium tetrachloride or titanium tetrabromide to molecular iodine is in the range of from about 1:1 to 0.1:1; and wherein the amount of the ether present during the polymerization is in the range of from about 0.01 to 30 parts by weight per hundred parts by weight butadiene.

3. The method of claim 2 wherein the mole ratio of the organolithium or organosodium compound to the organoaluminum hydride is in the range of from about 1:1 to 1:1.5; wherein the mole ratio of the titanium tetrahalide in the titanium halide component to the organoaluminum hydride is in the range of from about 0.5:1 to 0.2:1; wherein the mole ratio of titanium tetrachloride or titanium tetrabromide to molecular iodine is in the range of from about 0.5:1 to 0.33:1.

4. The method of claim 3 wherein the amount of total catalyst present during the polymerization based on the organoaluminum compound is in the range of from about 0.3 to 30 gram millimoles of organoaluminum compound per hundred grams of butadiene.

5. The method of claim 4 wherein the amount of total catalyst present during the polymerization based on the organoaluminum compound is in the range of from about 0.5 to 10 gram millimoles of organoaluminum compound per hundred grams of butadiene.

6. The method of claim 1 wherein the polymerization is carried out in the presence of a diluent which is not detrimental to the polymerization process; wherein the concentration of butadiene in the diluent is in the range of from about 1 to 200 weight percent; wherein the polymerization is carried out at a temperature in the range of from about 0° to 120°C; and wherein the polymerization is carried out at a pressure sufficient to maintain the polymerization mixture substantially in the liquid phase.

7. The method of claim 5 wherein the polymerization is carried out in the presence of a diluent selected from the group consisting of paraffins, cycloparaffins, and mixtures thereof containing 4 to 8 carbon atoms, wherein the concentration of butadiene in the diluent is in the range of from about 5 to 50 weight percent, wherein the temperature is in the range of from about 30° to 80° C, and wherein the polymerization is carried out at autogenous pressure.

8. The method of claim 7 wherein the diluent is n-hexane or cyclohexane, the organoaluminum compound is diethyl aluminum hydride, the organolithium compound is normal or secondary butyllithium, the titanium halide component is titanium tetrachloride plus molecular iodine, and ether is dimethyl ether.

9. The method of claim 1 wherein butadiene is polymerized to produce polybutadiene containing a substantial trans content.

10. The method of claim 9 wherein the trans content is in the range of from about 60 to 95 percent.

* * * * *